United States Patent [19]

Itoh et al.

[11] 4,377,603
[45] Mar. 22, 1983

[54] METHOD AND APPARATUS FOR ELECTROSTATIC POWDER COATING

[75] Inventors: Tsutomu Itoh, Tokyo; Nobuo Furuya; Kenji Ouchi, both of Chiba; Takeo Shimizu, Tokyo; Hiroshi Saitoh, Chiba, all of Japan

[73] Assignee: Onoda Cement Company, Limited, Japan

[21] Appl. No.: 90,395

[22] Filed: Nov. 1, 1979

Related U.S. Application Data

[63] Continuation of Ser. No. 849,394, Nov. 7, 1977, abandoned.

[30] Foreign Application Priority Data

Nov. 10, 1976 [JP] Japan ................................. 51-134159

[51] Int. Cl.³ ............................................. B05D 1/06
[52] U.S. Cl. ...................................... 427/25; 427/27; 427/299; 118/627; 118/629; 118/630
[58] Field of Search ........................ 118/627, 629, 630; 427/25, 27, 29, 299

[56] References Cited

U.S. PATENT DOCUMENTS

| | | | |
|---|---|---|---|
| 3,606,972 | 9/1971 | Ferrant | 239/706 X |
| 3,837,573 | 9/1974 | Wagner | 427/27 X |
| 3,951,340 | 4/1976 | Point | 427/25 X |
| 3,976,031 | 8/1976 | Itoh | 118/629 |
| 3,985,297 | 10/1976 | Itoh | 239/706 X |
| 3,991,710 | 11/1976 | Gourdine et al. | 118/630 X |
| 3,996,410 | 12/1976 | Gruetzman | 427/27 X |
| 4,011,991 | 3/1977 | Masuda | 118/629 X |

*Primary Examiner*—Shrive P. Beck
*Attorney, Agent, or Firm*—Robert E. Burns; Emmanuel J. Lobato; Bruce L. Adams

[57] ABSTRACT

A workpiece which may be made of a highly electrically insulating material is held in a spaced opposing relationship with respect to a silent discharge plate electrode to which an a.c. voltage is applied. A d.c. voltage is applied across the workpiece and the silent discharge plate electrode to form a driving electric field therebetween. Powder particles suspended in air are charged in the same polarity as that of the silent discharge plate electrode and then injected into the region between the silent discharge plate electrode and the workpiece where the electric field drives the charged particles toward the workpiece to coat it. The a.c. voltage is sufficient to repel the electrode surface confronting the workpiece and to maintain the silent discharge at a reduced level and effectively precluding deposit of powder particles on the mentioned surface. An apparatus for the electrostatic coating is also disclosed.

11 Claims, 5 Drawing Figures

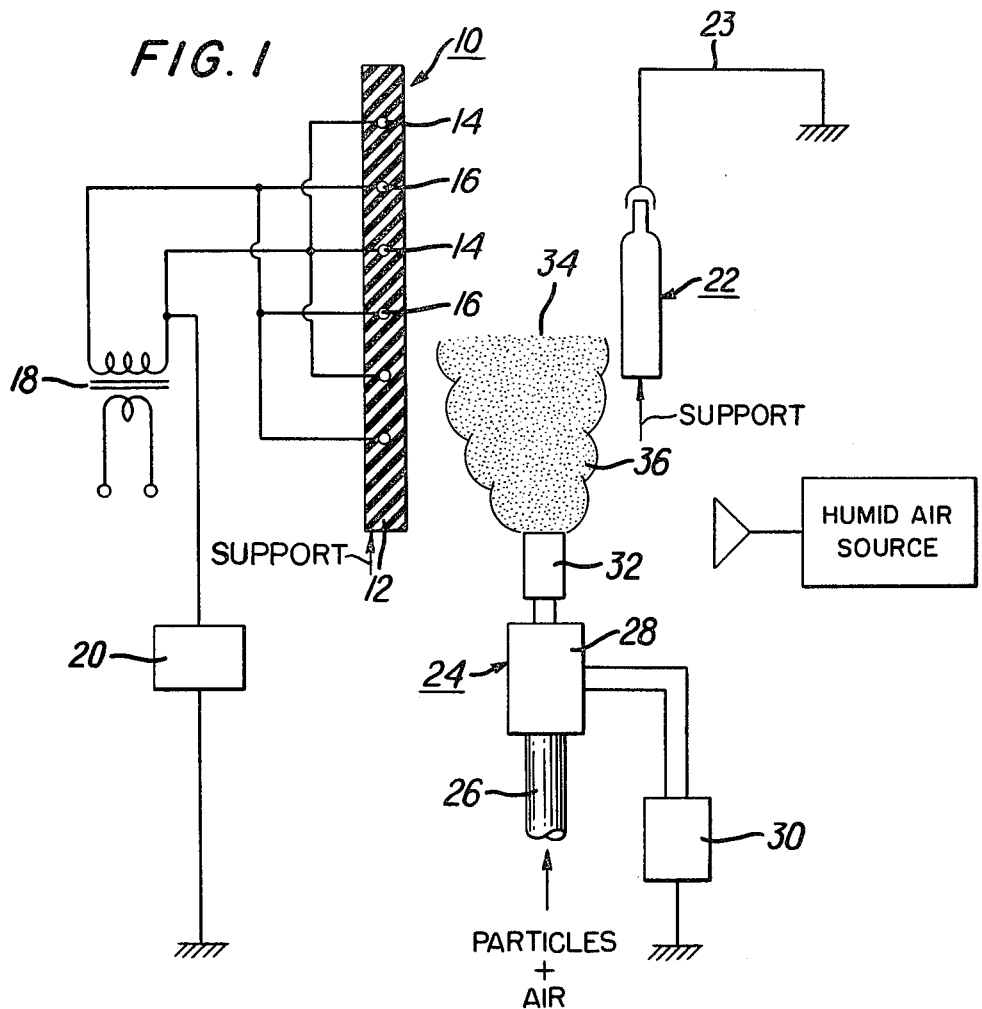
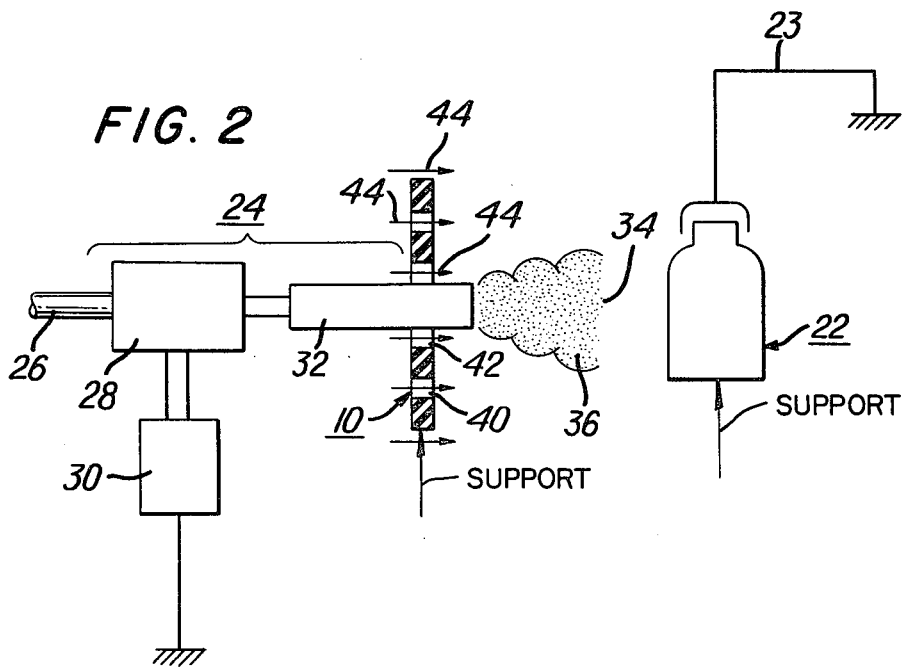

METHOD AND APPARATUS FOR ELECTROSTATIC POWDER COATING

This is a continuation, of application Ser. No. 849,394, filed Nov. 7, 1977 now abandoned.

BACKGROUND OF THE INVENTION

1. Field of the Invention

This invention relates to methods and apparatus for electrostatically coating a workpiece with a layer of powder such as paint powder, other synthetic resin powder and porcelain enamel frit, and in particular, to methods and apparatus particularly suitable for forming a thick powder layer at a high speed over a workpiece having a high electrical resistance such as a glass bottle.

2. Description of the Prior Art

In recent years, it has been desired to form a film of synthetic resin over the outer surface of glass bottles for use as containers for carbonated drinks such as Coca Cola (Trade Mark) and a certain carbonated cider-like drink in order to prevent accidents due to the failure or rupture of the bottles resulting from movement during shipping or an increase in the internal pressure when exposed to the sun. The desirability of this is increasing due to an increase in the size of the glass bottles.

One method for forming such a coating of synthetic resin is the electrostatic powder coating method. However, when this method is applied to a glass bottle, which is electrically insulative, the bottle must typically be heated to a temperature above the melting point of the synthetic resin powder. Since the glass bottle is heated during the coating process to above the melting point of the powder, it is almost impossible to remove the powder once placed on the bottle. Therefore, it is typical to use a gas jet for masking the vicinity of the mouth of the bottle in order not to coat the mouth of the bottle.

However, it is almost impossible to accomplish perfect masking for the powder in practical manufacturing lines, and when the mouth portion of the bottle on which a cap is to be placed is coated with the synthetic resin powder, serious problems such as imperfection in capping and decapping and ingress into the interior of the bottle of separated synthetic resin film flakes result. Also since the grippers of the conveyor for holding the glass bottles are heated due to thermal conduction from the pre-heated glass bottles, the synthetic resin powder deposited on the grippers is also a heated melt and accumulated thereon. In order to remove this accumulated resin, the conveyor must be periodically stopped, making continuous operation impossible. Also, the resinous film on the bottle neck has an uneven edge of a reduced uneven thickness, causing the film to be easily separated and broken at the upper edge during the washing, carrying and handling of the bottle. This results in a reduced life of the glass bottle, which is a critical concern for returnable glass bottles. Also, although it is desirable to form a straight neat edge of the resin film on the bottle for increasing the commercial value of the bottle, it is extremely difficult with the above described electrostatic coating method using preheated bottles to form a satisfactorily neat film edge.

In order to eliminate many of the above mentioned disadvantages relating to the prior art method for manufacturing resin coated bottles wherein a preheated glass bottle is coated with a layer of synthetic resin powder formed using a conventional electrostatic powder coating gun and then baked to form a hard coating, it is conceivable first to form a powder layer of a predetermined thickness on a bottle at room temperature, removing the resinous powder deposited on the undesired portion of the bottle by a suitable means, and then to heat the glass bottle on which a resinous powder layer of just enough thickness is formed on the desired portion only to thereby manufacture resin coated glass bottles. However, it is impossible to form a powder layer of desired thickness (Typically, a thickness of from $150\mu$ to $400\mu$ is required for the coating film after it has been baked) on a glass bottle at room temperature at the high speed required in the industrial manufacturing process with a conventional electrostatic powder coating apparatus for the reasons which will be described in detail below.

A typical conventional electrostatic powder coating gun achieves electrostatic powder coating by positioning a corona discharge electrode such as a corona pin or a corona edge within or in the vicinity of a nozzle for ejecting synthetic resin powder suspended in a gas, applying a high voltage across the electrode and a workpiece which is positioned in opposingly spaced relationship with the electrode to charge the suspended powder or particles ejected from the nozzle with the ion current which is generated from the corona discharge electrode and which is directed to the workpiece, and at the same time utilizing the electric field directed from the corona discharge electrode to the workpiece. However, when a workpiece having a high electrical resistance such as a glass bottle is coated with such an electrostatic coating gun, electric charge accumulates on the surface of the workpiece to increase the electrical potential thereof due to the high ion current flowing the corona discharge electrode to the workpiece. Therefore, the potential difference between the corona discharge electrode and the workpiece decreases to eventually reduce the electric field therebetween, and the corona discharge is also reduced, making it impossible to maintain the continuing discharge necessary for charging the powder. Therefore, with the just mentioned conventional electrostatic powder coating gun, it is completely impossible to form a synthetic resin powder layer of a desired thickness on the glass bottle with high reliability at room temperature.

U.S. Pat. No. 3,976,031 discloses a discharge coating apparatus wherein a workpiece and a silent discharge plate electrode are disposed in an opposing spaced apart relationship, a powder coating material being supplied therebetween, with the apparatus including means for applying an a.c. voltage for establishing silent discharge from the silent discharge plate electrode, and means for applying an electric voltage across the workpiece and the silent discharge plate electrode. When this discharge coating apparatus is used to coat a glass bottle, it is normally impossible to form a satisfactory coating film due to the decreased potential difference between the glass bottle which is the workpiece and the silent discharge plate electrode because the ion current flowing from the silent discharge plate electrode to the glass bottle is high. Although with this discharge coating apparatus the ion current flowing from the silent discharge electrode to the workpiece can be decreased to a relatively small amount, thereby enabling a relatively thick film of coating powder to be formed on the glass bottle at room temperature, this decreases the speed of the production line, rendering this prior art discharge coating apparatus to be inadequate for use in present bottle manufacturing plants.

In Japanese Laid-Open Patent Application No. 50-22839, laid open on Mar. 11, 1975 and corresponding to U.S. Pat. No. 3,991,710 granted to Gouridne et al. on Nov. 16, 1976 an electrogasdynamic powder coating apparatus is disclosed. The coating apparatus disclosed therein comprises a charged particle formation chamber and a deposit chamber disposed downstream from the charged particle formation chamber, a high voltage being applied to the inner wall thereof. Through these chambers, a cloud of charged particles and a workpiece are successively moved, to coat the workpiece with the particles solely by a space charge electric field established by the charged particle in the charged particle formation chamber, and to further coat the workpiece with the charged particles remaining after the previous coating process by utilizing an electric field formed by the high voltage applied to the inner wall of the deposit chamber in the deposit chamber. However, for the reasons which will be described below in detail, it is extremely difficult to use the electrogasdynamic powder coating apparatus disclosed in the above cited application on a large industrial scale in coating glass bottles at room temperature with powder particles for the purpose of preventing breakage of the bottles.

The synthetic resin coating film required for the purpose of preventing breakage of bottles must be very thick compared to ordinary electrostatic powder coating film as previously described. In order to form such a thick coating film, the main grain size of the synthetic resin powder used must be within the range of between $60\mu$ and $150\mu$. With the method disclosed in the aforementioned U.S. Pat. No. 3,991,710 these powder particles fall out within the coating apparatus at a high rate, making it difficult to maintain a satisfactory coating efficiency and production line speed. In particular, within the charged particle formation chamber in which powder coating is achieved by the space charge electric field alone, the strength of the space charge electric field decreases at a very high rate according to the distance from the workpiece because there is no external electric field present, lowering the coating efficiency. This is aggravated by the high fall out rate of the particle due to gravity. Also, as for charging within the charged particle formation chamber, it is extremely difficult to always maintain a perfect charge on the particles with the production system such as the system for manufacturing glass bottles required to be operated for very long continuous periods. From this point of view it is difficult to realize a satisfactory production line speed and a satisfactory coating efficiency.

When a voltage high enough to drive the charged particles toward the workpiece is applied to the inner wall of the deposit chamber, powder particles charged in the opposite polarity, which are formed to some extent in the charged particle formation chamber, deposit on the surface of the inner wall of the deposit chamber. The electric charge thus accumulated in the deposited powder layer brings simultaneous backdischarge within the deposited powder layer, causing a heavy current to flow from the inner wall to the workpiece. This electric current destroys the powder layer formed on the workpiece within the charged particle formation chamber and separates the powder from the workpiece. Therefore this method is practically impossible to use in coating glass bottles with synthetic resinous powder. In order to avoid this phenomenon, which is an obstacle in coating and which is derived from the backdischarge in the interior of the powder layer charged in the reverse polarity and accumulated on the inner wall surface of the deposit chamber, the voltage applied across the inner wall must be extremely low. However, with the extremely low voltage, the electric field directed from the inner wall to the workpiece is not strong enough to drive the charged particles toward the workpiece, resulting in severe difficulty in utilizing the apparatus for coating glass bottles at room temperature with synthetic resin powder for the purpose of preventing breakage of the bottles. Also, for the above reasons, the powder which has not contributed to coating of the workpiece rapidly accumulates in the deposit chamber making it impossible to operate the apparatus continuously.

In summary, the method as disclosed in above cited U.S. Pat. No. 3,991,710 although effective for powder particles of mean grain size of $50\mu$ or less and very easily charged in a single polarity, is not satisfactory for coating the workpiece with a thick layer of powder particles of relatively large grain size at a very high speed.

SUMMARY OF THE INVENTION

An object of the present invention is to provide a method and apparatus capable of continuous forming a powder layer having enough thickness for rupture proofing a glass bottle at room temperature on a large industrial scale.

Another object of the present invention is to provide a method and apparatus for electrostatic coating capable of coating a highly insulative workpiece without the need for preheating.

Still another object of the present invention is to provide an electrostatic powder coating method and apparatus wherein accumulation of the powder on the silent discharge electrode is prevented.

A further object of the present invention is to provide an electrostatic powder coating method and apparatus whereby the spray pattern is controllable.

With the above objects in view, the present invention resides in an electrostatic coating method wherein a workpiece which may be of a low electrically insulating material is positioned in a spaced opposing relationship with respect to a silent discharge plate electrode. A d.c. voltage is applied across the workpiece and the silent discharge plate electrode and an a.c. voltage is applied to the silent discharge plate electrode. The intensity of the a.c. voltage is such that it prevents charged powder from depositing on the electrode surface confronting the workpiece while maintaining silent discharge on the electrode surface at a reduced minimum powder particles suspended in air are introduced into the region between the workpiece and the silent discharge plate electrode where an electric field drives the particles toward the workpiece, whereby the driven particles deposit on and cost the surface of the workpiece.

The present invention also resides in an electrostatic coating apparatus which comprises a silent discharge plate electrode to which an a.c. voltage source is connected for applying as a.c. voltage on the electrode so that charge particles are repelled, and supporting means for supporting a workpiece such as a glass bottle in a spaced opposing relationship with respect to the silent discharge electrode. The apparatus further comprises a d.c. voltage source for applying a d.c. voltage across the workpiece and the silent discharge electrode to establish an electric field therebetween. A charged injection device is also included for injecting the charge powder particles into the electric field formed between the workpiece and the silent discharge electrode.

BRIEF DESCRIPTION OF THE DRAWINGS

The present invention will become more readily apparent from the following description of the preferred embodiments taken in conjunction with the accompanying drawings, in which:

FIG. 1 is a schematic diagram illustrating an electrostatic coating apparatus of the present invention;

FIG. 2 is a schematic diagram illustrating another electrostatic coating apparatus of the present invention;

DESCRIPTION OF THE PREFERRED EMBODIMENTS

Figure 3:
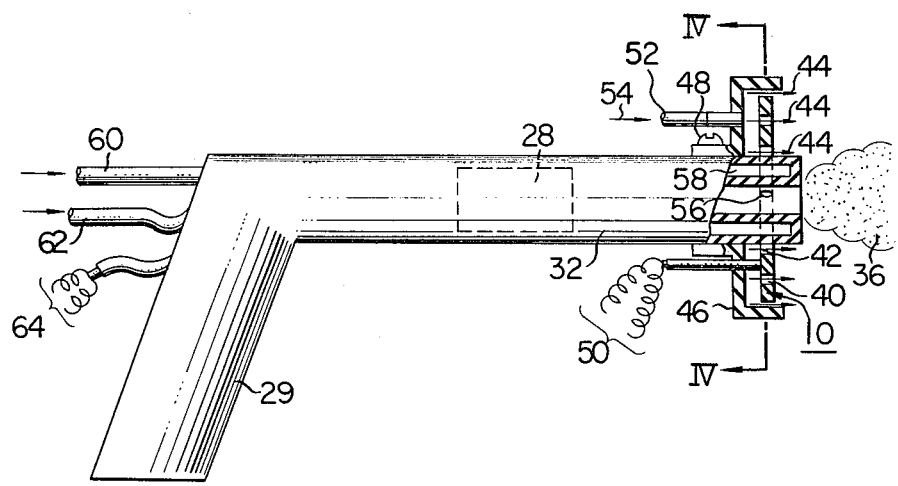
FIG. 3 is a schematic side view of an electrostatic coating apparatus in the form of a hand gun constructed in accordance with the present invention.

Referring now to the drawings and in particular to FIG. 1 thereof, the electrostatic powder coating apparatus according to the present invention comprises a silent discharge plate electrode 10 which may be a conventional silent discharge plate electrode such as illustrated and described in the aforementioned U.S. Pat. No. 3,976,031, Laid-Open Patent Application. The plate electrode 10 comprises an insulating plate 12 and a plurality of line electrodes 14 and 16 embedded in the plate 12 across which an a.c. voltage is applied by means of an a.c. voltage source 18. It is to be noted that line electrodes 14 and 16 are alternatively arranged in the plate 12 and that one polarity of the a.c. voltage source 18 is connected to the line electrodes 14 and the other polarity of the a.c. voltage source 18 is connected to the alternative line electrodes 16. By applying an a.c. voltage across the alternatively disposed line electrodes 14 and 16 by means of the a.c. voltage source 18, lines of electric force are formed on the powder particles present in the vicinity of the electrode surface to repel the uncharged particles present in the vicinity of the silent discharge plate electrode 10, thereby preventing the synthetic resin powder from depositing on the plate electrode surface.

A d.c. voltage source 20 is also connected to the line electrodes 14 and 16 so that a d.c. electric field directed from the surface of the silent discharge plate electrode 10 to a workpiece 22 which is illustrated as being a glass bottle grounded by an electrical lead 23.

The electrostatic coating apparatus of the present invention also comprises a charged powder injector 24. The charged powder injector 24 receives through a supply tube 26, from any suitable conventional supply source a mixture of air and powder or particles with which the workpiece 22 is to be coated, and charges the powder in the same polarity as that of the silent discharge plate electrode 10 using corona discharge, contact charge or silent discharge within a charge device 28. The charge device 28 is supplied with a sufficient high voltage from a voltage source 30 for charging the particles. The synthetic resin powder charged within the charge device 28 in the same polarity as that of the silent discharge plate electrode 10 is then ejected as charged particles 36 from the injection nozzle 32 into a space 34 between the workpiece 22 and the silent discharge plate electrode 10. It is to be noted that the charged powder injector 24 supplys the charged particles 36 through the injection nozzle 32 only after the particles are charged in the pre-charge device 28. Therefore, no silent discharge on the electrode 10 for further charging is needed and no ion current toward the workpiece flows, ensuring that only charged particles 36 are supplyed to the space 34 and the workpiece 22. Thus, since no silent discharge occurs and no ion current flows, the potential of the workpiece 22 does not increase even when the workpiece 22 is an article such as a glass bottle exhibiting a high electrical resistance at room temperature, and the coating electric field established between the silent discharge plate electrode 10 and the workpiece 22 is not disturbed when the charged particles 36 are introduced from the charged particle injector 24, ensuring that the charged particles 36 are driven toward the workpiece 22 and deposited thereon to form a powder layer on the workpiece at a high speed.

The charged particles 36 typically include a small amount of powder particles charged in the opposite polarity whatever high performance charge device may be used, and these oppositely charge particles are driven toward the silent discharge plate electrode 10 due to the presence of the electric field in the space 34. Therefore, if the plate electrode 10 were made of electrically conductive or semiconductive material, the oppositely charged particles would accumulate on the surface of the electrode 10, resulting in the backdischarge being generated on the surface due to the combined function of its own electric charge and the coating electric field present in the space 34. This reverse ionization causes a massive current to flow from the electrode plate 10 to the workpiece 22, making continuous stable coating impossible. However, this depositing of the powder on the plate electrode can be avoided by utilizing the silent discharge electrode 10 which prohibits the deposition of the powder by the repulsive force against the charged particles derived from the alternating non-uniform electric field formed in the vicinity of the electrode surface.

The charged particles also usually include some uncharged neutral particles. These neutral particles and the particles charged in the opposite polarity are not deposited on the workpiece and pass through the space thereby lowering the coating efficiency. In order to alleviate this problem, a voltage only sufficient to generate a very small silent discharge on the silent discharge electrode plate 10 may preferably be applied by the a.c. source 18 to thereby cause a very small discharge current to flow from the electrode plate 10 to the workpiece 22. This measure makes it possible to cause a considerable amount of the opposite polarity particles and the neutral particles to be recharged and to be deposited on the workpiece 22. This small current further causes the powder layer on the workpiece 22 to be strong and of high density.

It is to be noted, however, that the advantageous powder coating as previously described is only possible when the substantial portion of the charged particles injected into the space is charged in the desired polarity. With the apparatus having only a silent discharge electrode for charging and coating, such as disclosed in U.S. Pat. No. 3,985,297, and when the current flowing from the silent discharge plate electrode to the workpiece is of an order small enough not to increase the electrical potential of the workpiece, then it is not possible to attain a satisfactory production line speed and coating efficiency. In particular, it is absolutely impossible to form a thick powder layer on a workpiece such as a glass bottle which is electrically insulative at room temperature at a high speed at room temperature.

The resinous powder material that can be used with the electrostatic powder coating method and apparatus of the present invention includes the resin powder of such as the polyethylene group, EVA group and ionomer group which are particularly suitable for use in bottle coating, and ordinary electrostatic powder coating material such as acrilic, epoxy, polyester, polyethylene, polypropylene, fluorocarbon polymers, as well as frit for enamelling. However, since the current flowing from the silent discharge plate electrode 10 to the workpiece 22 must be maintained at a small value when the workpiece 22 is electrically insulative at room temperature such as when it is a glass bottle, the a.c. voltage for driving the silent discharge plate electrode 10 must be limited. Therefore, depending on the kind of powder, deposition of the powder sometimes takes place on the silent discharge plate electrode 10, making a stable continuous operation of the apparatus impossible. Under such circumstances, the a.c. voltage applied across the silent discharge plate electrode may be made intermittently high to ensure the generation of silent discharge at the electrode surface for re-charging and removing the particles accumulated on the electrode surface, and during the remaining period of time a low voltage may be applied to ensure that a low mean current flows toward the workpiece to thereby enable a satisfactory, stable and continuous operation to be carried out. Such a voltage may have an intermittent a.c. voltage high enough to remove the powder for 0.3 second followed by an a.c. voltage low enough to provide little current flowing from the silent discharge plate electrode 10 to the workpiece 22 for 0.7 second.

In the above embodiment of the present invention, the workpiece 22 is grounded and the d.c. high voltage is applied to the silient discharge plate electrode 10 by means of the d.c. voltage source 20 to form the electric field. However, this arrangement is only one of the embodiments of the present invention, and the high voltage may be applied to the workpiece 22 with no d.c. voltage being applied to the silent discharge plate electrode 10 if so desired. In this case, the essential requirement according to the present invention is that a d.c. electric field be established in the region between the silent discharge plate electrode 10 and the workpiece 22, and that the polarity of the pre-charge device 24 is selected so that synthetic resin powder charged in the polarity that is capable of being driven by the d.c. electric field toward the workpiece 22 is injected into the space 34. Therefore, in as much as the above requirement of the present invention is satisfied, many modifications and changes may be made in complicance with the application of the invention without departing from the spirit of the present invention.

Also, it is not necessary that the field formation d.c. voltage source 20 always provide a voltage of a single specified polarity. In case an extremely thick coating film is to be formed on the workpiece 22 for example, a voltage of a first polarity is first applied until a powder layer of a predetermined thickness is formed on the workpiece 22 and then a voltage of the second polarity is applied with the polarity of the pre-charge device 24 being changed accordingly, thereby forming a second powder layer having the second polarity on the first powder layer. By repeating this process, a very thick powder layer of desired thickness can be formed on the workpiece 22. Also, the a.c. voltage source 18 for applying the a.c. voltage to the silent discharge plate electrode 10 is typically a transformer as illustrated in FIG. 1, but the a.c. voltage source 18 may be in any form in as much as an a.c. voltage of a predetermined value can be applied to the silent discharge plate electrode 10. For example, an a.c. voltage may be applied to the silent discharge plate electrode through a capacitor.

As heretofore have been described in detail, the present invention provides a method and apparatus for forming a thick powder layer on workpiece 22 of an insulating material at a high speed by injecting precharged powder particles 36 into the space 34 between the workpiece 22 and the silent discharge plate electrode 10 disposed opposite to the workpiece 22. Since the present invention is made mainly to coat workpieces having an electrical resistance about that of glass bottles with a powder layer, when the workpiece is made of polyethylene, tetrafluoroethylene, epoxy resin or the like having a higher electrical resistance, the present invention may not always be directly applicable thereto. Still for ordinary glass bottles the present invention is directly applicable without the need for any pretreatment. However, in the event that the relative humidity of the air surrounding the bottle surface is very low and the electrical resistance of the bottle surface is unusually high, the resistance of the bottle surface may be suitably controlled for forming a satisfactory powder coating by simply applying high humidity air, steam, or water spray to the bottle, or cooling the bottle to a temperature a little lower than the ambient temperature.

When very fine sprayed water drops are applied to a bottle for the above mentioned pretreatment for conditioning the bottle surface, it is advantageous to add a surface activator to the water since some bottles are difficult to coat with a continuous thin water film. Also, the typical electrostatic glass bottle coating method includes a process of applying a liquid primer to the bottle surface prior to coating with the powder particles in order to enhance the bondage between the bottle and the applied synthetic resin film, and since the typical primer for this purpose includes water, alcohol, or other substances as well as a surface activator, it is not necessary to additionally add the surface activator into the spray water. In other words, under such circumstances, the process of applying such a primer also serves to control the electrical resistance of the bottle surface. However, a petroleum solvent should not be used as a diluent for the primer because it is high in electrical resistance.

When a thick powder layer is to be formed or the powder particles are very dry, the effect of the moisture given by the pretreatment is often lost, resulting in failure to form a powder layer of a desired thickness. In order to prevent this, the space 34 or the coating chamber should be maintained at a relative humidity of equal to or more than 70 percent, or advantageously equal to or more than 75 percent. Also, when too high a relative humidity exists within the coating chamber, the electrical insulation of the devices in the chamber may be adversely affected. Therefore, the relative humidity within the coating chamber should be equal to or less than 95 percent, or advantageously equal to or less than 90 percent. In this case it is also necessary that the temperature of the bottle surface be substantially equal to or less than the temperature within the coating chamber. This may be achieved by preconditioning the air for carrying the powder particles into the coating chamber through the pre-charged particle injection device within the above mentioned range of relative humidity. This ensures that the powder particles be suitably moisturized, and therefore that the powder layer coated on the workpiece does not absorb the moisture on the bottle surface, thereby reducing the effect of the moisturing pretreatment and decreasing the stability and the reliability of the electrostatic powder coating process.

Although the present invention has been described in conjunction with a glass bottle or other similarly insulating workpiece, the present invention is similarly applicable to workpieces having lower electrical resistances to form a thick layer of particles at a high speed. When a thin layer is to be formed, formation of the powder layer can be made more easily and more quickly.

A system for coating glass bottles with a layer of particles may comprise means for intermittently or continuously conveying workpieces supported at a predetermined interval according to the shape and the size of the workpiece by such as a conveyor, a chamber for surrounding the workpieces conveyed by the conveying means, and a silent discharge plate electrode disposed on the inner surface of the wall of the chamber, a charge injection device being disposed under, beside or above the chamber so as to be in communication with the interior of the chamber. Such a system makes possible a continuous formation of a powder layer on the workpiece at high speed.

The powder layer formed by the electrostatic coating method or the apparatus of the present invention is extremely dense due the almost perfect charge on the synthetic resin powder. Accordingly, when the present invention is applied to a glass bottle and an excess amount of the powder deposited around the bottle mouth is removed by such as the suction method, the edge of the powder layer formed by the removal is very sharp, maintaining the commercial value of the manufactured bottle as a commodity.

Also, since a very thick, dense powder layer can be formed on the bottle surface at room temperature, when the bottle is post-heated after it has been removed from the gripper and transferred into a heating apparatus, the gripper may easily be cleaned by a suction device, etc. to be used again, thereby facilitating continuous operation of the apparatus.

The direction into which the charged powder particles are introduced is not limited to the direction parallel to the silent discharge plate electrode as illustrated in FIG. 1, but good results can also be obtained by directing the charged particles to the workpiece through a plurality of openings formed in the silent discharge plate electrode as illustrated in FIG. 2. In FIG. 2, it is to be noted that components having the same functions are designated by the same reference numerals and that the electrodes of the silent discharge plate electrode and its power supply system are not illustrated. Also, in the embodiment shown in FIG. 2, in order to control the pattern of the charged particle cloud 36 in the space 34 and prevent accumulation of fine powder on the surface of the silent discharge plate electrode 10, a plurality of circumferential annuli such as annuli 40 and 42 are formed in the silent discharge electrode plate 10. Through these annular openings 40 and 42, a suitable gas such as air is passed as shown by arrows 44 in FIG. 2 to accomplish the above mentioned functions. The positional relationship between the open end of the injection nozzle 32 and the silent discharge plate electrode 10 may be made adjustable by using any suitable adjusting device such as set screws (not shown in FIG. 2) between these two components, making it possible to easily establish the optimum condition for electrostatic coating depending upon the shape and size of the workpiece 22, the particles used, coating conditions, etc.

Figure 4:
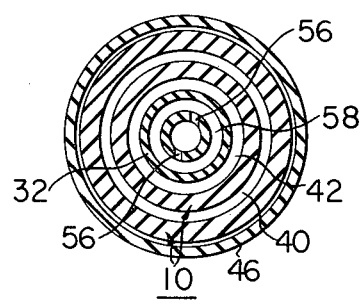
FIG. 4 is a cross section taken along the line IV—IV of FIG. 3.

FIGS. 3 and 4 show another embodiment of the present invention. Here the invention is applied to an electrostatic powder coating device in the form of a hand gun. The powder injection nozzle 32 is surrounded by a ring shaped silent discharge plate electrode 10 having formed therein two annuli 40 and 42. The ring-shaped silent discharge plate electrode 10 is supported by a cover 46 made of an insulating material which is slightly mounted on the injection nozzle 32 and is fixed at a desired position by means of a set screw 48. The silent discharge plate electrode 10 is supplied with voltage through electrical conductors 50 extending through the cover 46 and connected to an unillustrated voltage source. By adjusting the position of the silent discharge plate electrode 10 along the length of the powder injection nozzle 32, the mode of the lines of the electric force directed from the silent discharge plate electrode 10 to the workpiece 22 can be optimized for the particular workpiece, thereby improving the ability to coat the rear surface, etc. Apparently, this feature of the present invention is very advantageous over the conventional electrostatic powder coating gun. An air flow 54 for controlling the spray pattern or for preventing deposition of fine powder on the silent discharge plate electrode 10 is introduced by a tube 52 connected to the cover 46 into the space between the cover 46 and the silent discharge plate electrode 10. As shown by the arrows 44, the control air jet flows through the annular spaces 40 and 42 formed in the plate electrode 10 and through the annulus formed between the electrode 10 and the cover 46. In order to further control the spray pattern of the charged particles 36, the powder injection nozzle 32 may have in its inner surface small nozzles 56 through which a air flow is introduced into the interior of the nozzle opening from an annular chamber 58 formed within the injector nozzle 32 to surround the nozzle 32. The annular chamber 58 around the nozzle opening is communicated with any suitable air source (not shown) through an air hose 60. A mixture of air and the coating powder is introduced into the pre-charge device (not shown) disposed within the gun through a tube 62. Typically, the powder is introduced as being suspended in compressed air, but it may be transferred electrostatically without using air. The charge device 28 is supplied with voltage through a pair of conductors 64 connected to an unillustrated voltage source.

Figure 5:
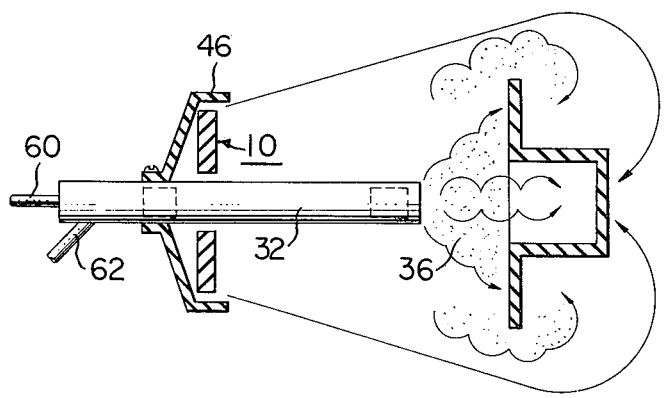
FIG. 5 is a schematic diagram showing the spray pattern of the charged particles according to the present invention.

Since the electrostatic powder coating gun of the present invention is arranged to be adjustable as to the relative position relationship between the open end of the powder injection nozzle made of an insulating material and the silent discharge plate electrode, when the gun is used with its injection nozzle 14 placed close to the workpiece 22 and with the silent discharge plate electrode 10 and the cover 46 placed relatively remote from the workpiece 22 so that the spray pattern of the charged particles 36 is widely open or quickly diverts toward the workpiece 22 with the aid of an auxiliary control air jet for example, a portion of the charged particles 36 injected from the injection nozzle 32 is carried toward the workpiece 22 by the air flow. These particles 36 are then attracted and deposited on the surface of the workpiece 22 due to their own charge. Accordingly, these particles 36 reach all areas of the indented surface on the front side of the workpiece 22. Also, since the distance between the silent discharge plate electrode 10 and the workpiece 22 is relatively remote, the lines of electric force generated from the silent discharge electrode 10 toward the workpiece 22 run around the workpiece 22 to reach the rear surface of the workpiece 22, thereby improving the powder deposition on the rear surface of the workpiece 22. Therefore, the whole surface of the workpiece 22 is satisfactorily coated with the charged particles 36. This feature of the present invention is not expected in the prior art electrostatic powder coating gun. The above described phenomenon is illustrated in FIG. 5.

When the workpiece 22 to be coated is an elongated article or a wide article, the opening formed in the central portion of the silent discharge plate electrode 10 may be formed in the form of an elongated slit having a length corresponding to the length or the width of the workpiece 22, and the injection nozzle 32 may be reciprocally moved along the length of the slit to thereby form a powder layer of uniform thickness on the surface of the workpiece 22. The silent discharge plate electrode 10 for this arrangement also surrounds the slit or the opening through which the injection nozzle 32 penetrates.

What is claimed is:

1. An electrostatic coating method for coating a workpiece with chargeable powder particles, comprising the steps of:
   supporting a workpiece to be coated with powder particles and a silent discharge plate electrode in a spaced opposed relationship;
   applying a d.c. voltage across the workpiece and said silent discharge plate electrode to establish an electric field in a space therebetween; applying an a.c. voltage to said silent discharge plate electrode across two spaced points thereon;
   introducing into said space between the silent discharge plate electrode and the workpiece for coating the workpiece charged powder particles having the same polarity as the silent discharge plate electrode,
   prior to introducing the charged powder particles into said space fully charging the particles to be coated on the workpiece externally of said space and with a separate d.c. voltage independent of the first-mentioned d.c. voltage and in the same polarity as that of the silent discharge electrode with a sufficient charge of said polarity on the maximum number of particles charged to effectively have the charged powder particles driven toward the workpiece when introduced into said electric field; and
   said a.c. voltage being applied to effectively repel the charged powder particles from an electrode surface confronting said space and to maintain silent discharge at the electrode surface very small to effectively prevent neutral uncharged particles and particles charged oppositely to said polarity from depositing on said surface of the silent discharge electrode, whereby the powder particles in said space are driven toward the workpiece to coat the workpiece and prevented from accumulating on said silent discharge electrode surface.

2. An electrostatic coating method for coating a workpiece with chargeable powder particles according to claim 1, wherein the workpiece is pre-treated to increase the humidity of the surface of the workpiece prior to applying the charged powder particles to said workpiece.

3. An electrostatic coating method for coating a workpiece with chargeable powder particles according to claim 1, in which the relative humidity of the surface of the workpiece coated is maintained equal to or more than 70 percent.

4. An apparatus for electrostatic coating of a workpiece with powder particles:
   a silent discharge plate electrode;
   means for supporting a workpiece spaced from a surface of the silent discharge plate electrode in opposed relationship thereto;
   means for applying a d.c. voltage across the workpiece and the silent discharge plate electrode to form an electric field in a space between said surface and the workpiece;
   charging means for charging powder particles to be applied electrostatically on the workpiece comprising means for charging the powder particles with a separate d.c. voltage independent of the first-mentioned d.c. voltage and in the same polarity as that of the silent discharge plate electrode to provide a sufficient charge on the powder particles effective for the powder particles to be electrostatically driven toward the workpiece when introduced into said space and the electric field therein;
   means for introducing the charged powder particles directly into said space and electric field;
   means for applying an a.c. voltage to said silent discharge plate at spaced points on said surface effective to repel the charged powder particles in said space away from said surface of the silent discharge plate while maintaining silent discharge at said electrode surface at a reduced level effective to prevent accumulation of the introduced charged particles on said surface of said silent discharge plate, whereby substantially all the charged particles are driven to the workpiece for coating it with a layer of powder particles.

5. An apparatus for electrostatic coating of a workpiece with powder particles according to claim 4, including means for increasing the relative humidity of a surface of the workpiece being coated.

6. An apparatus for electrostatic coating of a workpiece with powder particles according to claim 4, in which said means for applying said a.c. comprises means for intermittently applying a high a.c. voltage to said silent discharge plate electrode.

7. Apparatus for electrostatic coating of a workpiece with powder particles according to claim 4, in which said means to introduce the charged particles comprises an injection nozzles made of an electrical insulating material.

8. Apparatus for electrostatic coating of a workpiece with powder particles according to claim 7, wherein said silent discharge plate electrode has a central opening coincident with said injection nozzle for introducing therethrough said charged particles directly into said space.

9. Apparatus for electrostatic coating of a workpiece with powder particles according to claim 4, wherein said silent discharge plate includes means for allowing passage of gas therethrough into said space.

10. Apparatus for electrostatic coating of a workpiece with powder particles according to claim 4, including means for introducing a gas flow into said space to control a pattern of introduction of the charged particles introduced into said space.

11. Apparatus for electrostatic coating of a workpiece with powder particles according to claim 4, including means for adjusting the position relatively of said means for introducing the charged particles into said space and said silent discharge plate electrode thereby to adjustably control patterns of introduction of the charged particles into said space.

* * * * *